United States Patent [19]

Sahashi

[11] Patent Number: 5,777,466
[45] Date of Patent: Jul. 7, 1998

[54] ANNULAR SPEED SENSOR FOR A BEARING ASSEMBLY WITH A SET OF TEETH BEING BENT TOWARD OTHER SET OF TEETH

[75] Inventor: Koji Sahashi, Inabe-Gun, Japan

[73] Assignee: NTN Corporation, Osaka, Japan

[21] Appl. No.: 627,700

[22] Filed: Mar. 29, 1996

[30] Foreign Application Priority Data

Mar. 31, 1995 [JP] Japan .................. 7-100689

[51] Int. Cl.⁶ .............. G01P 3/487; G01P 3/488; F16C 19/00
[52] U.S. Cl. .............. 324/174; 324/207.22; 384/448
[58] Field of Search .............. 324/166, 173, 324/174, 207.15, 207.16, 207.22, 207.25; 384/448; 310/156, 168, 68 B; 188/181 R

[56] References Cited

U.S. PATENT DOCUMENTS

| | | | |
|---|---|---|---|
| 1,561,452 | 11/1925 | Alden | 324/174 |
| 3,676,765 | 7/1972 | Westcott | 310/168 |
| 4,316,144 | 2/1982 | Levijoki | 324/174 |
| 5,055,781 | 10/1991 | Sakakibara et al. | 324/207.25 |
| 5,111,098 | 5/1992 | Peck et al. | 310/268 |
| 5,200,697 | 4/1993 | Adler et al. | 324/174 |
| 5,223,760 | 6/1993 | Peck et al. | 310/168 |
| 5,381,090 | 1/1995 | Adler et al. | 324/174 |
| 5,394,081 | 2/1995 | Ogawa et al. | 324/207.25 |
| 5,603,575 | 2/1997 | Ouchi | 324/174 |

FOREIGN PATENT DOCUMENTS 1200031  9/1965  Germany .................. 324/174

Primary Examiner—Sandra L. O'Shea
Assistant Examiner—Jay M. Patidar
Attorney, Agent, or Firm—Harness, Dickey & Pierce, PLC

[57] ABSTRACT

An annular speed sensor especially adapted for motor vehicle wheel applications. The sensor utilizes an annular stator having a radial wall joining with inner and outer cylindrical walls, thus forming an annular cavity. An annular coil winding is fixed within the stator annular cavity. The cylindrical walls define teeth which confront a rotating magnetized tone ring to produce an alternating magnetic flux through the stator. One of both sets of stator teeth are deflected to increase the surface area of the teeth exposed to the tone wheel to produce better magnetic coupling between these elements.

6 Claims, 4 Drawing Sheets ns
5,777,466

ANNULAR SPEED SENSOR FOR A BEARING ASSEMBLY WITH A SET OF TEETH BEING BENT TOWARD OTHER SET OF TEETH

BACKGROUND

This invention is related to a wheel speed sensor and particularly to one adapted to be used in connection with a motor vehicle application.

Wheel speed sensors are used in a variety of applications. For automotive use, wheel speed sensors are used to measure the angular velocity of the vehicle wheels as part of an anti-lock braking system (ABS) and/or a traction control system. Electrical signals from wheel speed sensors are used by a controller to modulate pressure applied to the vehicle wheels to improve braking performance. In addition, braking application is used to enhance traction through the use of differential braking.

Various types of wheel speed sensors are presently known for motor vehicle applications. Variable reluctance types are currently favored since they perform well in the hostile motor vehicle environment. In the design of a variable reluctance type speed pick-up, there is a need to provide a high level electrical output at low wheel speeds. There is further a need to design such a transducer which provides adequate output where the gap between the sensor and the relatively rotating magnetized disk or "tone ring" occurs.

SUMMARY OF THE INVENTION

In accordance with this invention, an annular configuration wheel speed sensor of the variable reluctance type is provided which provides improvements over prior art designs.

Further objects, features and advantages of the invention will become apparent from a consideration of the following description and the appended claims when taken in connection with the accompanying drawings.

BRIEF DESCRIPTION OF THE DRAWINGS

FIG. 2 (B) is an illustration showing the relationship between the tone ring and the teeth of the stator of the sensor shown in FIGS. 1 and 2 (A).

PRIOR ART DESIGNS

Figure 1:
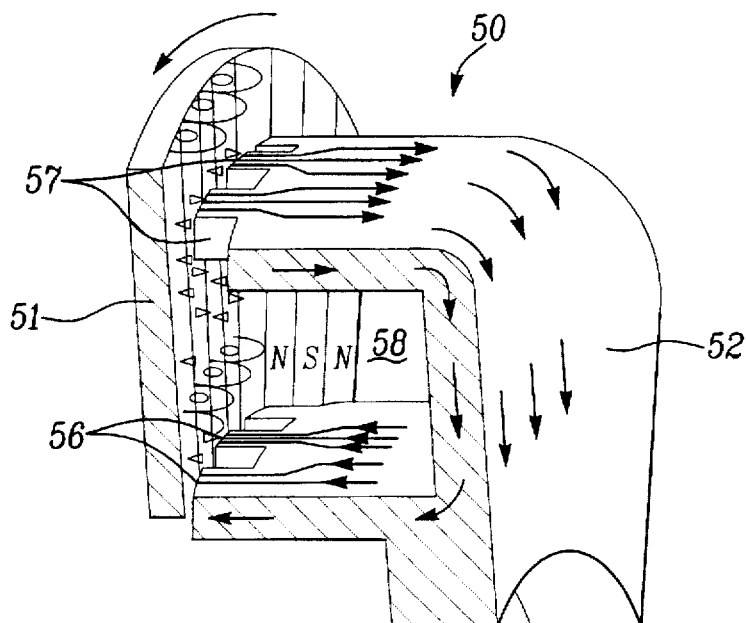
FIG. 1 is a partial pictorial view of an annular wheel speed sensor of prior art design.
Figure 2B:
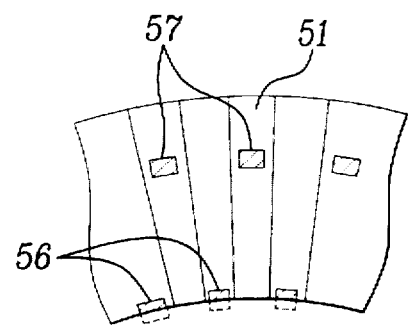
FIG. 2 (A) is an enlarged partial cross-sectional view of the prior art as shown in FIG. 1.
Figure 2A:
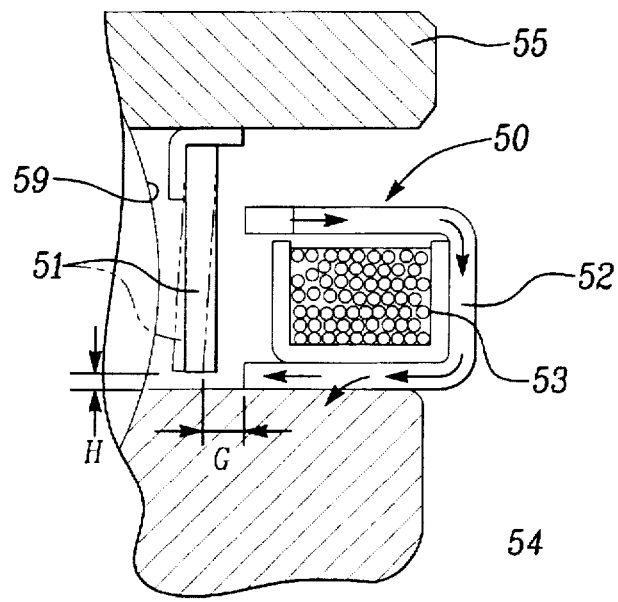

With reference to FIGS. 1 and 2, a prior art design of an annular wheel speed sensor is shown. annular speed sensor 50 shown in FIG. 1 includes stator 52 forming an annular cavity 58 with rows of inner teeth 56 and outer teeth 57. Tone ring 51 rotates relative to stator 52 and has regions of magnetic alternating North and South poles which are oriented along radials with respect to the center of rotation of tone ring 51. FIG. 2 (B) illustrates that while outer teeth 57 are exposed to magnetic region s of one pole (South), inner teeth 56 are exposed to the opposite magnetic pole (North). In this way, as relative rotation occurs between stator 52 and tone ring 51, an alternating magnetic field of reversing polarity passes through stator 52. Arrows along the surface of stator 52 in FIG. 1 illustrate magnetic lines of force passing through the stator. Coil winding 53 placed within stator cavity 58 as shown in FIG. 2 (A) is exposed to the changing magnetic field and produces a voltage signal of alternating polarity.

FIG. 2 (A) illustrates annular speed sensor 50 integrated into a wheel bearing in which inner race 54 is non-rotatable with respect to the vehicle (often found in non-driven motor vehicle wheels). Stator 52 is press-fit onto inner race 54. Tone ring 51 is pressfit onto outer race 55 which rotates with the vehicle wheel. Ball elements 59 roll between races 54 and 55 to provide a bearing effect. The 20 relative position of inner race 54 and outer race 55 may vary slightly due to moment loads which act on the wheel bearing when the vehicle undergoes a turn or other maneuvers. In such conditions, tone ring 51 may slant as shown by the broken line position of the tone ring in FIG. 2 (A). In this case, the air gap "G" between tone ring 51 and stator inside teeth 56 becomes large, resulting in a reduction in output voltage from coil 53.

In the design of the speed sensor, a radial clearance designated by "H" is necessary between inner race 54 and the inside edge of tone ring 51 since these components move relative to one another. Consequently, inner teeth 56 do not fully overlap the inside portion of tone ring 51 and thus there is poor magnetic coupling between these elements, thereby further reducing electrical output.

DETAILED DESCRIPTION OF THE PREFERRED EMBODIMENTS

Figure 3A:
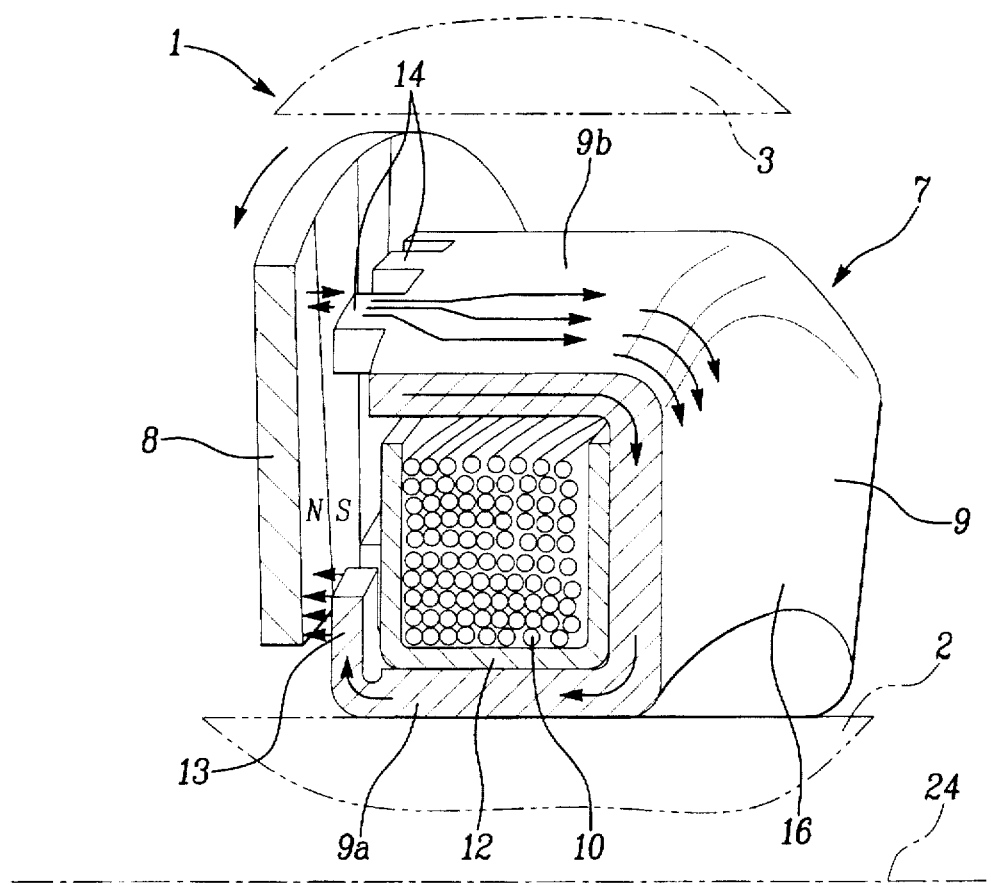
FIG. 3(A) is a partial pictorial view of a first embodiment of a speed sensor in accordance with the present invention.
Figure 3B:
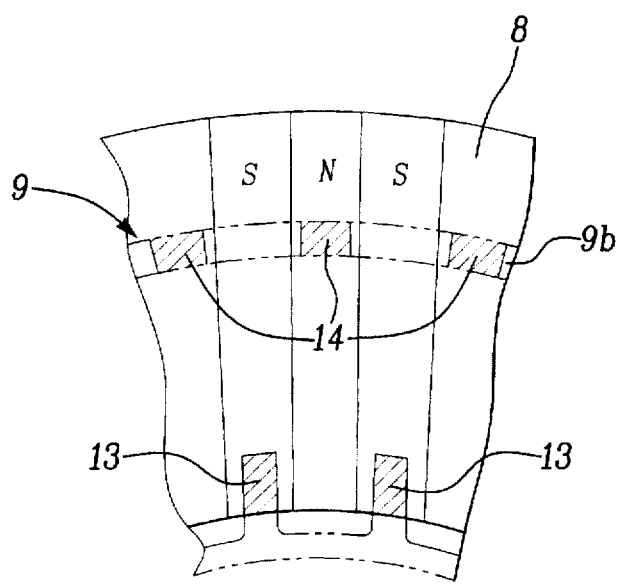
FIG. 3 (B) is an enlarged illustration showing the relationship between the tone ring and the stator teeth of the embodiment shown in FIG. 3 (A).

FIGS. 3 (A) and 3 (B) illustrate an annular speed sensor 1 in accordance with a first embodiment of this invention. Annular speed sensor 1 is integrated into a wheel bearing assembly having an inner race 2 and outer race 3. A plurality of balls (not shown in FIG. 3 (A)) are provided between the races which allow the inner race 2 and outer race 3 to undergo relative rotation. In sensor 1, tone ring 8 has magnetic poles magnetized alternately in the circumferential direction and is mounted to outer race 3 in this design. Stator 9 is formed in a shape of an annular shell having a radially extending wall 16 with an inner cylindrical wall 9a and forming inner teeth 13, and an outer cylindrical wall 9b forming outer teeth 14. Inner teeth 13 and outer teeth 14 are arranged as shown in FIG. 3 (B) to face different magnetic pole regions of tone ring 8. Transducer coil 10 is positioned within the annular cavity of stator 9 and generates an output voltage corresponding to the change in magnetic fields passing through the stator as shown, transducer coil 10 is wound within bobbin 12. In accordance with a principal feature of this invention, annular sensor stator 9 features inner teeth 13 which are bent in a L-shaped configuration toward outer cylindrical wall 9 (b) to partially enclose the stator annular cavity. In this design, inner teeth 13 are bent approximately 90° with respect to inner cylindrical wall 9a. Outer teeth 14 are directed in the axial direction (ie. their terminal end surfaces face tone ring 8). Throughout this description, "axial" refers to a direction parallel to the axis of rotation of tone ring 8, designated by reference number 24, whereas "radial" refers to a direction perpendicular to the axis of rotation.

Since inner teeth 13 of stator 9 are bent in the radial direction, they provide a larger surface area facing the magnetic pole regions of tone ring 8. In the event that tone ring 8 would slant due to moment loads acting on the bearing assembly, the larger facing area provides a larger area for the transference of magnetic flux, resulting in a lower reduction in the output signal. In addition, the bent teeth 13 provide better overlapping of the tone ring 8.

In the embodiment described above and shown in FIGS. 3 (A) and 3 (B), tone ring 8 is fixed to outer race 3 and rotates with it. The tone ring 8 has a plurality of South and North magnetic poles that alternate in the circumferential direction as shown in FIGS. 3 (B). Thus, a magnetic flux is formed through the stator 9 passing from the outer teeth 14 to the inner teeth 13, and from the inner teeth 13 to the outer teeth 14, alternating as tone ring 8 rotates. This change in magnetic flux generates an alternating current (AC) in coil 10. The frequency of voltage induced in coil 10 corresponds to the relative rotational speeds of stator 9 and tone ring 8.

Figure 4A:
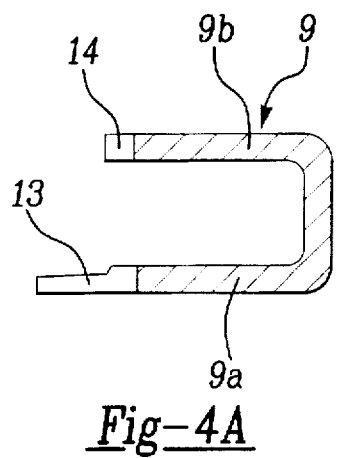
FIGS. 4 (A) and 4 (B) are illustrations showing a stator having bent teeth in partially and fully formed configurations.
Figure 4B:
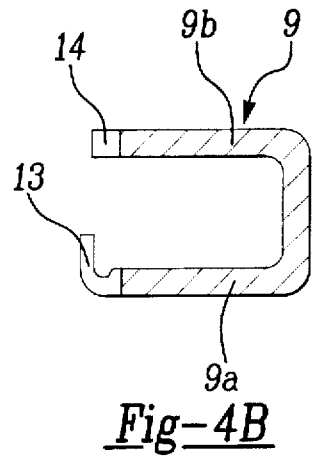

The structure of stator 9 shown in FIG. 3 (A) can be readily manufactured. Referring to FIGS. 4 (A) and 4 (B), it is shown that it is possible to make inner teeth 13 of the stator 19 thinner than the remainder of stator 9, for example in a stamping process. With this reduced thickness, the teeth 13 can be easily bent to the configuration shown in FIG. 2 (B).

Figure 5:
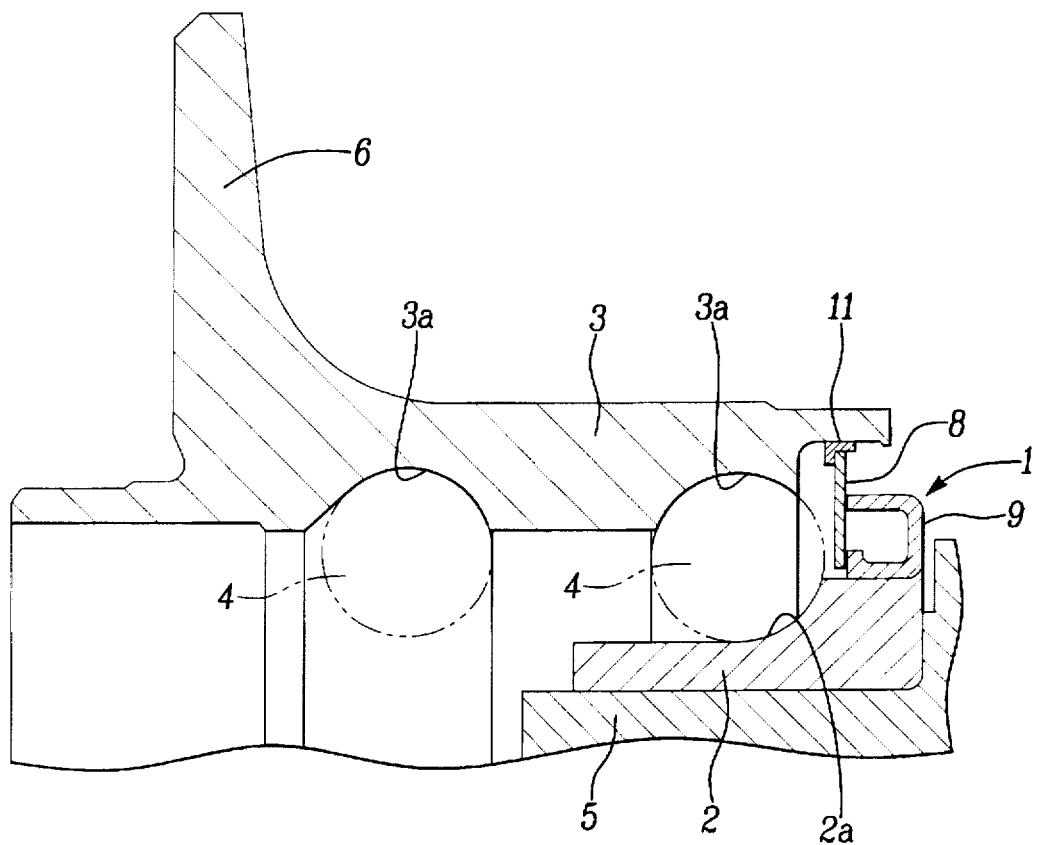
FIG. 5 is a cross-sectional view of a wheel hub assembly including the annular speed sensor shown in FIG. 3 (A).

FIG. 5 shows a hub assembly incorporating sensor 1. In this configuration, outer race 3 integrally forms a motor vehicle wheel mounting flange 6. Balls 4 ride in an outer race raceway 3 (a) and an inner race raceway 2 (a). Inner race 2 is press-fit onto spindle 5, and stator 9 is press-fit onto inner race 2 and confronts tone ring 8. Tone ring 8 is maintained in position through the use of a carrier ring 11 which is press-fit into an inner cylindrical surface formed by outer race 3.

Figure 6:
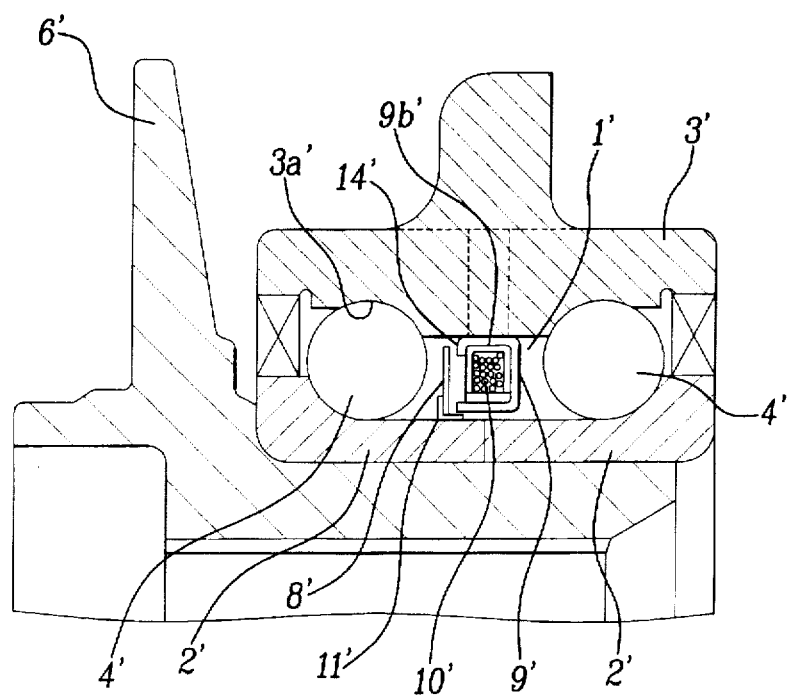
FIG. 6 is a cross-sectional view of a hub assembly incorporating a second alternative embodiment of an annular speed sensor according to this invention.

FIG. 6 illustrates another embodiment of an annular speed sensor 1' in accordance with this invention. Elements of sensor 1' identical to those of sensor 1 are designated by like reference numbers with an apostrophe. In this case, wheel mounting flange 6' rotates with the bearing inner race 2', and stator 9' and tone ring 8' are mounted between two rows of balls 4'. The bearing assembly is installed in a vehicle where outer race 3' is stationary whereas inner race 2' rotates with a drive shaft (not shown). The tone ring 8' is fixed by carrien ring 11' to the outer surface of the inner race 2' and the stator 9' having transducer coil 10' therein is fixed to the inside bore surface of the outer race 3'. In this configuration outer teeth 14' are bent inwardly in a radial direction since in this case, it is the outer edge of tone ring 8' which is likely to exhibit a greater separation gap in response to forces acting on the bearing assembly. Moreover, like the prior embodiment, a radial clearance around the tone ring is needed thus limiting the overlap of the transducer teeth.

Figure 7:
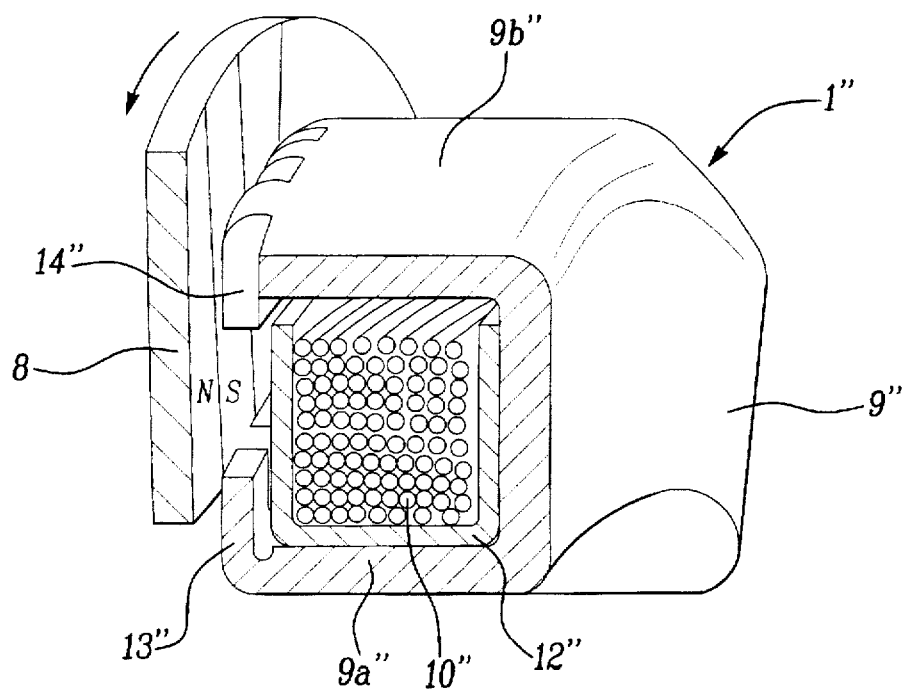
FIG. 7 is a partial pictorial view of an annular speed sensor according to a third alternative embodiment of the present invention.

Yet another embodiment of the invention is shown with reference to FIG. 7. In this embodiment of annular speed sensor 1", the outer teeth 14" of the stator 9" are bent inwardly and inner teeth 13" are bent outwardly as describe in the prior embodiment, transducer coil 10" is wound within bobbin 12" and is positioned within stator 9' between inner cylindrical wall 9a' and outer cylindrical wall 9b'. In this case, the outer teeth 14" are preferably made thin as well as the inner teeth as shown in FIG. 2. In this configuration, the facing area between both sets of teeth 13" and 14" are increased, thereby enhancing output voltage.

In addition to increasing output, the provision of radially bent teeth further serves to mechanically trap the coil 10 in the sensor stator 9.

It is to be understood that the invention is not limited to the exact construction illustrated and described above, but that various changes and modifications may be made without departing from the spirit and scope of the invention as defined in the following claims.

I claim:

1. An annular speed sensor for a bearing assembly having an inner bearing race located radially within an outer bearing race having an axis of rotation, said bearing assembly further having a plurality of rolling bearing elements located radially between said inner and outer bearing races permitting relative rotation between said races, said sensor comprising:

a tone ring defining a radially extending face oriented generally perpendicular to said axis of rotation, said face having regions of magnetic poles which alternate in polarity along said face in a circumferential direction, said tone ring being affixed to one of said bearing races, an annular stator affixed to the other of said bearing races such that relative rotation between said races causes relative rotation between said tone ring and said stator, said stator made of a ferromagnetic material, said stator having a radially extending side wall oriented generally perpendicular to said axis of rotation and joining with an inner cylindrical wall defining a set of inner teeth and joining with an outer cylindrical wall defining a set of outer teeth, said cylindrical walls and said side walls forming an annular cavity, at least one of said inner or outer sets of teeth being bent toward the other of said inner or outer sets of teeth and extending generally perpendicularly from said cylindrical wall, said set of teeth being arranged relative to said tone ring magnetic pole regions such that said inner set of teeth is magnetically coupled to regions of said tone ring defining one magnetic pole while said outer set of teeth is magnetically coupled to regions of said tone ring defining the opposite magnetic pole, and said stator teeth coupled to said tone ring such that said poles exposed to said inner and outer sets of teeth alternate upon relative rotation between said tone ring and said stator, and a conductor winding wrapped circumferentially around said stator and installed within said annular cavity whereby an alternating magnetic flux passing through said stator in response to said relative rotation induces an alternating voltage in said winding.

2. An annular speed sensor according to claim 1 wherein said inner set of teeth are bent in a radially outward direction and partially enclose said annular cavity.

3. An annular speed sensor according to claim 2 wherein said stator is affixed to said inner race and said tone ring is affixed to said outer race.

4. An annular speed sensor according to claim 1 wherein said outer set of teeth are bent in a radially inward direction and partially enclose said annular cavity.

5. An annular speed sensor according to claim 4 wherein said stator is affixed to said outer race and said tone ring is affixed to said inner race.

6. An annular speed sensor according to claim 1 wherein said teeth being bent have a material thickness less than that of remaining portions of said stator cylindrical walls.

* * * * *